A. Y. McDONALD.
Fence-Post.
No. 167,185. Patented Aug. 31, 1875.
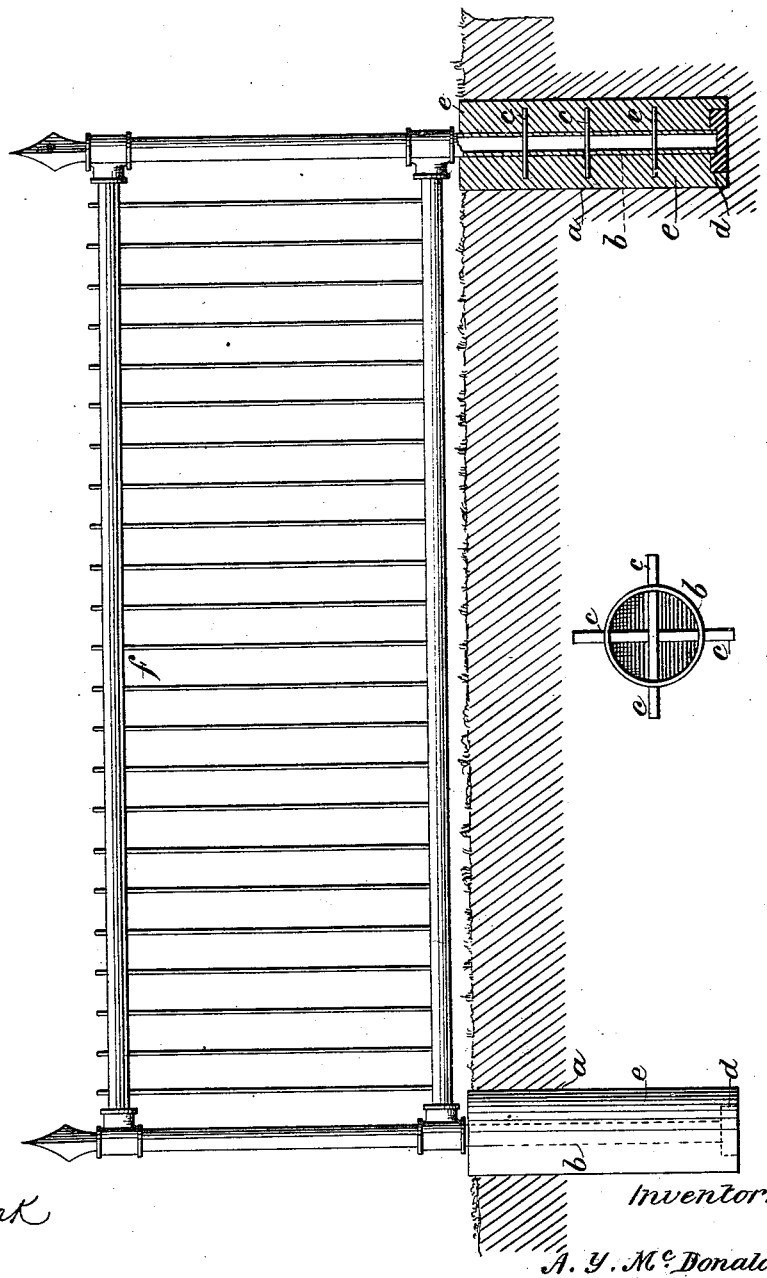
Witnesses:
Harry C. Clark
James J. Finley
Inventor.
A. Y. McDonald
by H. W. Beadle & c.
Attys.

UNITED STATES PATENT OFFICE.

ANDREW Y. McDONALD, OF DUBUQUE, IOWA.

IMPROVEMENT IN FENCE-POSTS.

Specification forming part of Letters Patent No. 167,185, dated August 31, 1875; application filed June 24, 1875.

*To all whom it may concern:*

Be it known that I, A. Y. McDONALD, of the city and county of Dubuque, and State of Iowa, have invented certain Improvements in the Construction and Setting of Fence, Awning, and Hitching Posts, of which the following is a specification:

The nature and object of my invention are the construction of fence, awning, and hitching posts in the ground in such a manner and of such materials that it shall be, when constructed, at the same time firmly set.

This object is effected in the following manner: An excavation is made in the ground, which I find most conveniently to be accomplished with a post-auger, from three to ten inches in diameter, and about three feet deep, according to the size and weight of the fence to be sustained. In the center of this hole I place a gas-pipe, though a bar of iron or post of wood may be used, in a perpendicular position. Around this I pour hydraulic lime, concrete, mortar, cement, or any other cohesive or plastic substance, which may be used in a liquid or plastic state, and which will afterward become solid, filling the hole to a little more than level with the ground. If great weight is to be sustained, then I bore a number of holes in the pipe, and through them run rods of iron at right angles with the post and with each other, and at the bottom of the pipe I place a T or large nut as an anchor.

The manner of constructing and setting these posts is fully illustrated by the accompanying drawings, forming a part of this specification.

Figure 1 represents the fence-post as constructed and set. Fig. 2 represents a sectional view of the same with its surroundings when set.

$a\ a$ denote the interior surface of the excavation; $b\ b$, the gas-pipe placed perpendicular in the center of the hole; $c\ c$, the rods running through the post at right angles to the post and to each other; $d$, the T or nut at the base of the post for an anchor; $e\ e$, the cement placed around the pipe, filling the hole, in a liquid or plastic state, and which hardens afterward and forms a solid post. $f$ represents the fence as resting upon the posts.

Having thus described this device, what I claim as my invention, and for which I desire Letters Patent, is—

The post $b$, cross-rods $c$, and nut $d$, held in position by a concrete material applied in a plastic condition, substantially as described.

ANDREW Y. McDONALD.

Witnesses:
WILLIAM GRAHAM,
T. S. WILSON, Jr.